(12) United States Patent
Xu et al.

(10) Patent No.: US 11,589,322 B2
(45) Date of Patent: Feb. 21, 2023

(54) POWER SHARING METHOD AND APPARATUS

(71) Applicant: ZTE Corporation, Guangdong (CN)

(72) Inventors: Hanqing Xu, Guangdong (CN); Yajun Zhao, Guangdong (CN); Xincai Li, Guangdong (CN); Ling Yang, Guangdong (CN); Juan Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 62 days.

(21) Appl. No.: 17/180,376

(22) Filed: Feb. 19, 2021

(65) Prior Publication Data

US 2021/0176717 A1    Jun. 10, 2021

Related U.S. Application Data

(60) Division of application No. 16/716,313, filed on Dec. 16, 2019, now Pat. No. 11,272,463, which is a continuation of application No. PCT/CN2018/091655, filed on Jun. 15, 2018.

(30) Foreign Application Priority Data

Jun. 16, 2017  (CN) .......................... 201710459676.0

(51) Int. Cl.
*H04W 52/36*    (2009.01)
*H04W 76/15*    (2018.01)
(Continued)

(52) U.S. Cl.
CPC ..... *H04W 52/367* (2013.01); *H04W 72/0446* (2013.01); *H04W 72/0473* (2013.01); *H04W 76/15* (2018.02)

(58) Field of Classification Search
CPC ........... H04W 52/367; H04W 72/0446; H04W 72/0473; H04W 76/15; H04W 52/242;
(Continued)

(56) References Cited

U.S. PATENT DOCUMENTS 8,811,322 B2    8/2014  Feuersanger et al.
10,205,575 B2 *  2/2019  Han ...................... H04L 5/0007
(Continued)

FOREIGN PATENT DOCUMENTS

CN    102158942 A    8/2011
CN    104349443 A    2/2015
(Continued)

OTHER PUBLICATIONS

Ericsson, "UL Power control in dual connectivity," 3GPP TSG RAN WG1 Meeting #76, Shenzhen, China, Mar. 31-Apr. 4, 2014, R1-141645, 5 pages.
(Continued)

*Primary Examiner* — Ankur Jain
*Assistant Examiner* — Angelica Perez
(74) *Attorney, Agent, or Firm* — Perkins Coie LLP (57) ABSTRACT

Disclosed is a power sharing method, including: determining a transmit power of a UE on a first carrier and a transmit power of the UE on a second carrier; and receiving first uplink traffic transmitted by the UE on the first carrier according to the transmit power on the first carrier, and receiving second uplink traffic transmitted by the UE on the second carrier according to the transmit power on the second carrier. Further disclosed are a power sharing apparatus, a storage medium, and a processor.

6 Claims, 2 Drawing Sheets

(51) Int. Cl.
*H04W 72/0446* (2023.01)
*H04W 72/044* (2023.01)

(58) Field of Classification Search
CPC . H04W 52/346; H04W 52/146; H04W 72/04; H04W 72/0453; H04W 72/0486; H04W 72/0493; H04W 52/281; H04W 72/08
See application file for complete search history.

(56) References Cited

U.S. PATENT DOCUMENTS

| | | | |
|---|---|---|---|
| 10,271,316 | B2 | 4/2019 | Nogami et al. |
| 10,506,529 | B2 | 12/2019 | Pelletier et al. |
| 10,750,391 | B2 | 8/2020 | Dinan |
| 2013/0178221 | A1 | 7/2013 | Jung et al. |
| 2015/0282104 | A1 | 10/2015 | Damnjanovic et al. |
| 2016/0094327 | A1 | 3/2016 | Han et al. |
| 2016/0183195 | A1 | 6/2016 | Gao et al. |
| 2016/0242128 | A1 | 8/2016 | Loehr et al. |
| 2016/0255665 | A1 | 9/2016 | Futaki |
| 2017/0280441 | A1* | 9/2017 | Shimezawa ......... H04W 52/325 |

FOREIGN PATENT DOCUMENTS

| | | |
|---|---|---|
| CN | 106851809 A | 6/2017 |
| WO | 2013/165228 A1 | 11/2013 |
| WO | 2016047747 A1 | 3/2016 |
| WO | 2016114889 A1 | 7/2016 |

OTHER PUBLICATIONS

Supplementary European Search Report in EP Patent Application No. 18818285.1, dated May 21, 2021, 20 pages.
European Search Report for EP Patent Application No. 21212618.9, dated Apr. 5, 2022, 13 pages.
Partial Supplementary European Search Report issued in EP Patent Application No. 18818285.1, dated Feb. 12, 2021, 20 pages.
LG Electronics: "Discussion on power sharing for LTE-NR DC", 3GPP Draft; R1-1707683 UL PC for DC, 3rd Generation Partnership Project (3GPP), Mobile Competence Centre ; 650, Route Des Lucioles ; F-06921 SophiaAntipolis Cedex ; France, vol. RAN WG1, No. Hangzhou; May 15, 2017-May 19, 2017 May 14, 2017 (May 14, 2017), XP051272890, Retrieved from the Internet: URL:http://www.3gpp.org/ftp/Meetings_3GPP SYNC/RAN1/Docs/ [retrieved on May 14, 2017].
NTT Docomo: "Power-control mechanisms for dual connectivity", 3GPP Draft; R1-142264, 3rd Generation Partnership Project (3GPP), Mobile Competence Centre ; 650, Route Des Lucioles ; F-06921 Sophia-Antipolis Cedex ; France, vol. RAN WG1, No. Seoul, Korea; May 19, 2014-May 23, 2014 May 18, 2014 (May 18, 2014), XP050787858, Retrieved from the Internet: URL:http://www.3gpp.org/ftp/Meetings_3GPP SYNC/RAN1/Docs/ [retrieved on May 18, 2014].
Sharp: "UL power control for dual connectivity", 3GPP Draft; R1-142201, 3rd Generation Partnership Project (3GPP), Mobile Competence Centre ; 650, Route Des Lucioles ; F-06921 Sophia-Antipolis Cedex ; France, vol. RAN WG1, No. Seoul, Korea; May 19, 2014-May 23, 2014 May 18, 2014 (May 18, 2014), XP050787797, Retrieved from the Internet: URL:http://www.3gpp.org/ftp/Meetings_3GPP SYNC/RAN1/Docs/ [retrieved on May 18, 2014].
Huawei, et al., "Overview of NR UL for LTE-NR coexistence," 3GPP TSG RAN WG1, Meeting #89, Hangzhou, China, R1-1706905, 12 pages, May 2017.
International Search Report and Written Opinion dated Aug. 23, 2018 for International Application No. PCT/CN2018/091655, filed on Jun. 15, 2018 (14 pages).
Canadian office action for Canadian patent application No. 3,135,459, dated Dec. 13, 2022, 3 pages.

* cited by examiner

POWER SHARING METHOD AND APPARATUS

CROSS-REFERENCE TO RELATED APPLICATIONS

This patent document is a divisional of and claims the benefit of priority to U.S. patent application Ser. No. 16/716,313, filed on Dec. 16, 2019, which is a continuation of and claims the benefit of priority to International Patent Application No. PCT/CN2018/091655, filed on Jun. 15, 2018, which claims the benefit of priority of Chinese Patent Application No. 201710459676.0, filed on Jun. 16, 2017. The entire contents of the before-mentioned patent applications are incorporated by reference as part of the disclosure of this application.

TECHNICAL FIELD

The present application relates to the field of communication technologies, for example, to a power sharing method and apparatus.

BACKGROUND

In the past few decades, mobile communication has experienced a leap from voice traffic to high-speed broadband data traffic. With the further development of new traffic such as the mobile Internet and the Internet of Things, new demands for mobile networks will further increase. In one aspect, mobile network data volumes are expected to grow explosively in the future. In another aspect, massive device connections and diverse traffic and applications are one of the key features of future wireless communication systems, and human-centered communication and machine-centered communication will coexist for development. Based on the diverse traffic and application requirements of mobile communication in the future, wireless communication systems must meet diverse requirements, including requirements in terms of throughput, delay, reliability, link density, cost, power consumption, complexity, and coverage. A new generation mobile communication system of 5G new radio access (NR) technologies comes into being.

In the related art, for a 5G NR non-standalone deployment scenario, for example, NR and long term evolution (LTE) are deployed in a dual connectivity (DC) manner, where LTE is a master base station (a master base station (MeNB) or master cell group (MCG) in the fourth generation mobile communication technology) and NR is a secondary base station (a secondary base station (SgNB) or secondary cell group (SCG) in the fifth generation mobile communication technology). Alternatively, NR is the master base station, and LTE is the secondary base station. Uplink transmission of a user equipment (UE) is restricted by a maximum transmit power (Pcmax), and thus a problem of how to allocate uplink power of LTE and NR exists.

For a 5G NR standalone deployment scenario, DC of NR and NR, collision avoidance (CA) of NR and NR, and the like also face a problem of how to allocate uplink power.

SUMMARY

The embodiments of the present application provide a power sharing method and apparatus to solve at least the problem that power cannot be allocated when a UE is deployed on multiple carriers in the related art.

According to an embodiment of the present application, a power sharing method is provided, and the method includes: determining a transmit power of a user equipment (UE) on a first carrier and a transmit power of the UE on a second carrier; and receiving first uplink traffic transmitted by the UE on the first carrier according to the transmit power on the first carrier, and receiving second uplink traffic transmitted by the UE on the second carrier according to the transmit power on the second carrier.

According to another embodiment of the present application, a power sharing method is further provided, and the method includes: receiving a transmit power on a first carrier and a transmit power on a second carrier which are determined by a base station; and transmitting first uplink traffic on the first carrier according to the transmit power on the first carrier, and transmitting second uplink traffic on the second carrier according to the transmit power on the second carrier.

According to another embodiment of the present application, a power sharing apparatus is provided, and the apparatus includes: a determining module, which is configured to determine a transmit power of a user equipment (UE) on a first carrier and a transmit power on a second carrier; and a receiving module, which is configured to receive uplink traffic transmitted on the first carrier by the UE according to the transmit power on the first carrier, and receive uplink traffic transmitted on the second carrier by the UE according to the transmit power on the second carrier.

According to another embodiment of the present application, a power sharing apparatus is further provided, and the apparatus includes a power receiving module and a transmitting module.

The power receiving module is configured to receive a transmit power on a first carrier and a transmit power on a second carrier which are determined by a base station.

The transmitting module is configured to transmit first uplink traffic on the first carrier according to the transmit power on the first carrier, and transmit second uplink traffic on the second carrier according to the transmit power on the second carrier.

According to another embodiment of the present application, a storage medium is further provided. The storage medium is configured to store program codes for executing the methods of the above-mentioned embodiments.

According to another embodiment of the present application, a processor is further provided. The processor is configured to run programs which, when run, execute the methods of above-mentioned embodiments.

The problem that the power cannot be allocated when the UE is deployed on multiple carriers is solved, and the effect that the UE transmits uplink traffic by using multiple carriers is achieved.

DETAILED DESCRIPTION

The present application will be described hereinafter in detail through embodiments with reference to the drawings.

In a case of no conflict, the embodiments described herein and the features thereof may be combined with each other.

In an embodiment, the terms "first", "second" and the like in the description and claims of the present application are used to distinguish between similar objects and are not necessarily used to describe a particular order or sequence.

Embodiment 1

Figure 1:
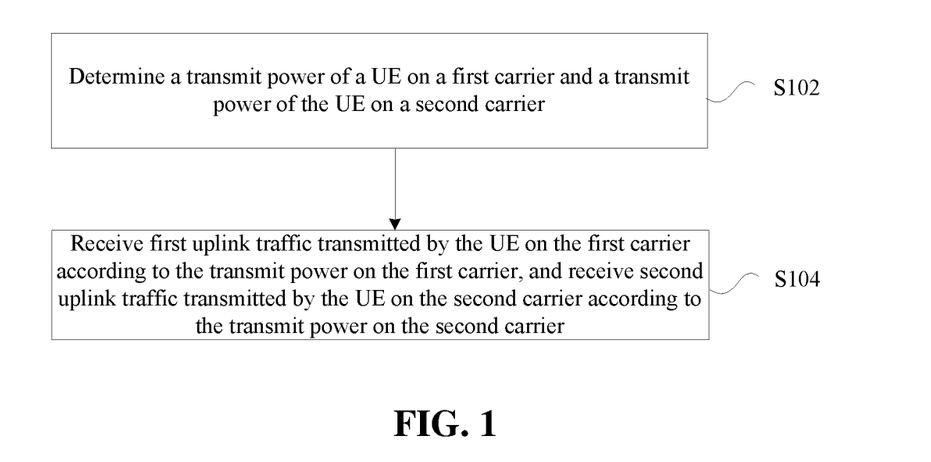
FIG. 1 is a flowchart of a power sharing method according to an embodiment of the present application.

The embodiment provides a power sharing method. FIG. 1 is a flowchart of the power sharing method according to an embodiment of the present invention. As shown in FIG. 1, the method includes the steps described below.

In step S102, a transmit power of a UE on a first carrier and a transmit power of the UE on a second carrier are determined.

In S104, first uplink traffic transmitted by the UE on the first carrier according to the transmit power on the first carrier is received, and second uplink traffic transmitted by the UE on the second carrier according to the transmit power on the second carrier is received.

Through the above steps, the transmit power of the UE on the first carrier and the transmit power on the second carrier are determined; the first uplink traffic transmitted by the UE on the first carrier according to the transmit power of the first carrier is received, and the second uplink traffic transmitted by the UE on the second carrier according to the transmit power of the second carrier is received. The problem that the power cannot be allocated when the UE is deployed on multiple carriers is solved, and the effect that the UE transmits uplink traffic by using multiple carriers is achieved.

In an embodiment, the execution body of the above steps may be a base station, such as an access network base station, etc., but is not limited thereto. The UE may be an NR UE, or may be another UE supporting NR communication schemes.

In an embodiment, the first carrier and the second carrier in the embodiment may be applicable to different scenarios, and may play different roles in different network environments, which may be, but are not limited to the following roles.

The first carrier is a dedicated carrier, and the second carrier is a supplementary uplink frequency (SUL). The dedicated carrier refers to an uplink carrier having a paired downlink carrier. For a frequency division duplex (FDD) carrier, the frequencies of the uplink carrier and the downlink carrier are different but are similar and the frequency characteristics are also similar. For a time division duplex (TDD) carrier, the frequencies of the uplink carrier and the downlink carrier are the same, that is, the uplink carrier and the downlink carrier are the same carriers.

For example, the dedicated carrier is an NR dedicated carrier, and the supplementary uplink frequency (SUL) refers to that only uplink traffic exists on the carrier. During actual transmission, no carrier having the same frequency as the SUL or no downlink carrier having a frequency close to the SUL for downlink transmission exists. For example, an LTE uplink shared carrier is used for NR transmission, and the paired downlink carrier of the LTE uplink shared carrier is not used for NR transmission. For NR, the LTE uplink shared carrier is the SUL.

The first carrier is the dedicated carrier, and the second carrier is a shared carrier.

The first carrier is a carrier of a first Radio Access Technology (RAT), and the second carrier is a carrier of a second RAT.

The first carrier is a carrier carrying a first traffic type, and the second carrier is a carrier carrying a second traffic type. In an embodiment, the carrier carrying the first service type is a carrier of an enhanced mobile broadband traffic, and the carrier carrying the second service type is a carrier of ultra reliable and low latency communication (URLLC). The two carriers may be the same carrier and transmit different types of traffic. The two carriers may also be two different carriers and transmit different types of traffic. Alternatively, the carrier carrying the first traffic type transmits the traffic by adopting a first parameter, for example, the subcarrier spacing is 15 kHz, and the carrier carrying the second traffic type transmits the traffic by adopting a second parameter, for example, the subcarrier spacing is 30 kHz.

In an embodiment, the first carrier is a carrier of a master base station or MCG in a DC scenario, and the second carrier is a carrier of a secondary base station or SCG in the DC scenario.

In an embodiment, the first carrier is a carrier of a secondary base station or SCG in a DC scenario, and the second carrier is a carrier of a master base station or MCG in the DC scenario.

In an embodiment, the step of receiving the first uplink traffic transmitted by the UE on the first carrier according to the transmit power on the first carrier and receiving the second uplink traffic transmitted by the UE on the second carrier according to the transmit power on the second carrier may be, but is not limited to, the following steps.

The first uplink traffic transmitted by the UE on the first carrier at a first time is received, and the second uplink traffic transmitted by the UE on the second carrier at a second time is received, where the first uplink traffic is the same as the second uplink traffic.

The first uplink traffic transmitted by the UE on the first carrier at a first time is received, and the second uplink traffic transmitted by the UE on the second carrier at a second time is received, where the first uplink traffic is different from the second uplink traffic.

The first uplink traffic and the second uplink traffic which are simultaneously and respectively transmitted by the UE on the first carrier and the second carrier are received, where the first uplink traffic and the second uplink traffic are the same or different.

In an embodiment, the uplink traffic includes at least one of: NR uplink traffic or LTE uplink traffic. According to different network environments, the uplink traffic may also be 2G or 3G uplink traffic.

In an embodiment, the step of receiving the first uplink traffic and the second uplink traffic which are simultaneously and respectively transmitted by the UE on the first carrier and the second carrier includes one of the following steps.

NR uplink traffic and LTE uplink traffic which are simultaneously and respectively transmitted by the UE on an NR dedicated carrier and an LTE shared carrier are received.

The NR uplink traffic which is simultaneously transmitted by the UE on an NR dedicated carrier and the LTE uplink traffic and the NR uplink traffic which are transmitted on the LTE shared carrier are received.

In an embodiment, one of the followings is included.

One is semi-statically configuring a first type of subframe or slot or a second type of subframe or slot, where the first type of subframe or slot is used for the UE to simultaneously transmit one of the following in a same subframe or slot: traffic of different carriers or traffic of different RATs, and the second type of subframe or slot is used for the UE to transmit one of the following in a same subframe or slot: traffic of a single carrier or traffic of a single RAT.

Another is semi-statically configuring a third type of subframe or slot or a fourth type of subframe or slot, where the third type of subframe or slot is used for the UE to transmit traffic of the first carrier in the third type of subframe or slot, and the fourth type of subframe or slot is used for the UE to transmit traffic of the second carrier in the fourth type of subframe or slot.

Another is semi-statically configuring a fifth type of subframe or slot, where the fifth type of subframe or slot is used for the UE to fixedly transmit the traffic of the first carrier or the traffic of the second carrier.

In an embodiment, semi-statically configuring includes: configuring through a high-layer radio resource control (RRC) signaling; or configuring through system information.

In an embodiment, the step of determining a transmit power of a UE on a first carrier and a transmit power of the UE on a second carrier includes the following steps.

In S11, a maximum transmit power of the UE is determined.

In S12, a total transmit power is allocated to the first carrier and the second carrier, where the value of the total transmit power is less than or equal to the value of the maximum transmit power.

In an embodiment, the step of allocating a total transmit power to a first carrier and a second carrier includes the following steps.

In S21, propagation quality of the first carrier and the second carrier is compared.

In S22, the total transmit power is allocated to the first carrier and the second carrier according to the propagation quality, where a transmit power allocated to the first carrier is negatively correlated with propagation quality of the first carrier and a transmit power allocated to the second carrier is negatively correlated with propagation quality of the second carrier.

In an embodiment, the step of allocating a total transmit power to a first carrier and a second carrier includes the following steps.

In S31, priorities of a UE for transmitting uplink traffic on the first carrier and transmitting uplink traffic on the second carrier are determined.

In S32, the total transmit power is allocated to the first carrier and the second carrier according to the priorities.

In an embodiment, a transmit power allocated to a first carrier is positively correlated with the priority of transmission traffic on the first carrier, and a transmit power allocated to a second carrier is positively correlated with the priority of transmission traffic on the second carrier.

In an embodiment, the step of allocating a total transmit power to a first carrier and a second carrier includes the following steps.

In S41, a first minimum guaranteed power corresponding to the first carrier is allocated to the first carrier, and a second minimum guaranteed power corresponding to the second carrier is allocated to the second carrier.

In S42, a remaining power of the total transmit power is allocated according to priorities of transmission traffic or propagation quality of carriers.

In an embodiment, the step of determining a transmit power of a UE on a first carrier and a transmit power of the UE on a second carrier includes at least one of the following steps.

The transmit power on the first carrier and the transmit power on the second carrier are determined when the UE accesses to a base station.

The transmit power on the first carrier and the transmit power on the second carrier are determined when the UE is in a connected state.

In an embodiment, before determining the transmit power of the UE on the first carrier and the transmit power on the second carrier, the method further includes: obtaining an uplink transmit power of the UE according to a path loss calculation of a downlink carrier of the UE.

In an embodiment, before determining the transmit power of the UE on the first carrier and the transmit power on the second carrier, the method further includes the following steps.

The UE is configured in one of the following manners.

A maximum transmit power of the UE is configured, where a sum of the transmit power of the UE on the first carrier and the transmit power of the UE on the second carrier is less than or equal to the maximum transmit power.

A maximum transmit power of the UE on the first carrier and a maximum transmit power of the UE on the second carrier are configured.

A first minimum guaranteed power of the UE on the first carrier and a second minimum guaranteed power of the UE on the second carrier are configured.

In an embodiment, before determining the transmit power of the UE on the first carrier and the transmit power on the second carrier, the method further includes one of the following steps.

A physical random access channel (PRACH) to be transmitted on an uplink carrier having a paired carrier in a downlink or an uplink carrier having a same frequency as a downlink carrier is limited.

A preamble initial target received power or DELTA_PREAMBLE configured on the second carrier is transmitted to the UE through system information, or the preamble initial target received power or the DELTA_PREAMBLE configured on the second carrier is transmitted to the UE through RRC signaling.

Second carrier frequency information is transmitted to the UE so that the UE determines a path loss offset (PL_offset) between the first carrier and the second carrier according to the second carrier frequency information, or a combination serial number of the first carrier and the second carrier is transmitted to the UE so that the UE determines the PL_offset between the first carrier and the second carrier according to the combination serial number of the first carrier and the second carrier.

At least one of the following is notified to the UE through the system information or the RRC signaling: a nominal power P0 or a path loss compensation coefficient $\alpha$ of the second carrier. From the description of the embodiment described above, it will be apparent to those skilled in the art that the methods in the embodiments described above may be implemented by software plus a general-purpose hardware platform, or may of course be implemented by hardware. However, in many cases, the former is a preferred implementation mode. Based on such understanding, the technical solution of the present application may be essentially embodied in the form of a software product. The computer software product is stored in a storage medium (such as a read-only memory (ROM), a random-access memory (RAM), a magnetic disk or an optical disk) and the storage medium includes multiple instructions for enabling a terminal device (which may be a mobile phone, a computer, a server, or a network device) to execute the method described according to each embodiment of the present application.

Embodiment 2

A power sharing apparatus is also provided in the embodiment, and the apparatus is used to implement the methods described in the above embodiments, and what has been described will not be repeated. As used below, the term "module" may be software, hardware or a combination thereof capable of implementing predetermined functions. Although the apparatus described in the following embodiments is preferably implemented by software, implementation by hardware or a combination of software and hardware is also possible and conceived.

Figure 2:
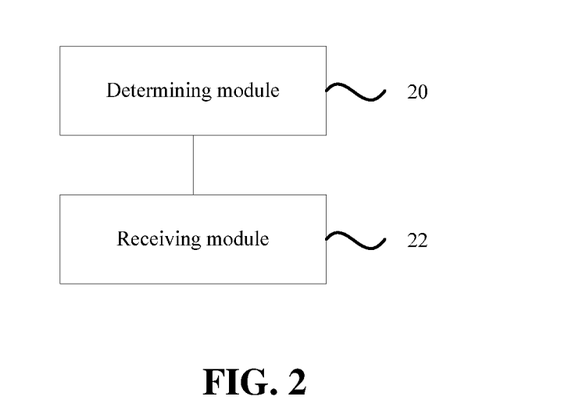
FIG. 2 is a structural block diagram of a power sharing apparatus according to an embodiment of the present application.

FIG. 2 is a structural block diagram of a power sharing apparatus according to an embodiment of the present application. As shown in FIG. 2, the apparatus includes a determining module 20 and a receiving module 22.

The determining module 20 is configured to determine a transmit power of a UE on a first carrier and a transmit power of the UE on a second carrier.

The receiving module 22 is configured to receive uplink traffic transmitted on the first carrier by the UE according to the transmit power on the first carrier, and receive uplink traffic transmitted on the second carrier by the UE according to the transmit power on the second carrier.

In an embodiment, the various modules described above may be implemented by software or hardware. Implementation by hardware may, but may not necessarily, be performed in the following manners: the above modules are all located in the same processor; or one or more modules described above are respectively located in different processors in any combination form.

Embodiment 3

The embodiment is for a power sharing problem in the LTE and NR coexistence scenario. For example, the NR is deployed in a 3.5 GHz TDD frequency band, and the NR up link (UL) may also be transmitted on the FDD UL low frequency band shared carrier of the LTE. Then for an NR UE, several cases of uplink transmission may exist.

a. The NR UE transmits an NR channel or signal merely on an NR TDD frequency band.
  b. The NR UE transmits the NR channel or signal merely on the LTE FDD UL shared carrier.
  c. The NR UE simultaneously transmits the NR channel or signal on the NR TDD frequency band and on the LTE FDD UL shared carrier, to indicate allocation of power.
  d. The NR UE also has the capability of supporting LTE transmission, and also transmits an LTE channel or signal on the LTE FDD UL carrier. At this time, how the UE allocates the power of the NR UL and the LTE UL is a problem to be solved in the embodiment.

The embodiment provides a power sharing method and apparatus to solve the problem of power sharing between NR and NR and between NR and LTE to ensure effective transmission thereof and meanwhile to ensure a requirement of specific Absorption rate (SAR) is met.

According to different implementation steps or scenarios, the embodiment includes multiple different instances.

Instance 1

NR may share a frequency band of LTE with the LTE for transmission, that is, for the NR, NR traffic may also be transmitted on the LTE frequency band. For the scenario where the NR and the LTE share an LTE UL carrier, for example, UL carrier frequency of the LTE is F1 (for example, near 700 MHz), and down link (DL) carrier frequency is F2 (an FDD carrier paired with the F1, which is also at 700 MHz), and a dedicated carrier frequency of the NR is F3 (for example, 3.5 GHz, a TDD carrier). However, a frequency band of the dedicated carrier frequency F3 of the NR differs greatly from a frequency band of the shared carrier frequency F1, for example, the following characteristic differences exist.

Wireless channels, including path loss, penetration loss, and shadow fading and the like differ greatly.

Transmit (TX) antenna configuration/receive (RX) antenna configuration, including the number of antennas, antenna gain, and the like differs greatly.

Beamforming technologies differ. Downlink path loss measurement of an NR UE is performed based on signals transmitted at the NR dedicated carrier frequency F3, and UL open loop power control depends on estimated downlink path loss. The algorithm is based on the assumption that an uplink frequency and a downlink frequency are the same or not significantly different (e.g. both are 700 MHz), and that the path loss is not significantly different. The residual difference may be corrected by closed loop power control. Therefore, no problem exists with the UL open loop power control at the NR dedicated carrier frequency F3. However, due to the characteristic difference between the high frequency band and the low frequency band, a measurement result at the F3 may not be directly applied to the uplink shared carrier F1, and the NR UE cannot know the path loss of the shared F1, and thus the accurate UL power control cannot be performed. Therefore, it is necessary to solve problems of path loss estimation and uplink power control on a shared carrier.

Figure 3:
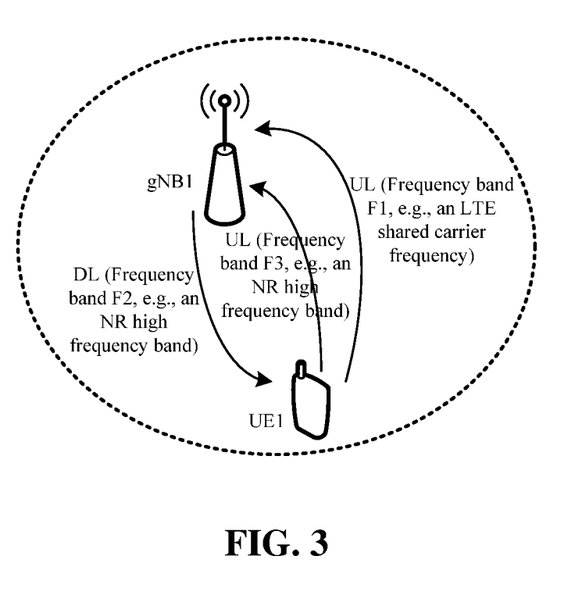
FIG. 3 is a schematic diagram of NR uplink and downlink transmission carrier frequencies according to an embodiment of the present application.

The problems of path loss estimation and UL power control exist in the same RAT such as NR when transmission is performed at a high frequency and at a low frequency. For example, as shown in FIG. 3, FIG. 3 is a schematic diagram of NR uplink and downlink transmission carrier frequencies according to an embodiment of the present application. A high frequency band of the NR is the NR dedicated carrier frequency, and a low frequency band of the NR is the LTE shared carrier frequency used by the NR or another NR carrier low frequency. Problems in different scenarios are similar, and problems of the path loss estimation and uplink power control in the low frequency band are to be solved.

The specific solutions are as follows. The first case is about the transmission of a physical random access channel (PRACH) of initial access, that is, how to determine the UL transmit power of a preamble in a low frequency band (e.g. at an LTE shared carrier frequency F1).

In method 1, the initial access is limited to be performed merely on an uplink carrier having a paired downlink carrier or on an uplink carrier having the same frequency as the downlink carrier. Transmit power of the preamble on the uplink carrier is based on estimated path loss on the downlink carrier. That is, the path losses on the uplink carrier and the downlink carrier may be considered to be approximate or the same.

The uplink carrier having the paired downlink carrier refers to that the uplink carrier and the downlink carrier have a small frequency spacing and the frequency characteristic difference is not large, and both the uplink carrier and the downlink carrier may be used for NR transmission. The path loss or UL power control for the uplink carrier may be obtained based on the downlink carrier. For example, both uplink carrier and downlink carrier are at 700 MHz or 1700 MHz.

For example, both the UL carrier and the DL carrier of the LTE 700 MHz are shared with the NR. Then, when a preamble is transmitted on a 700 MHz UL carrier in NR, path loss may be calculated based on the DL carrier.

For another example, merely the UL carrier of LTE 700 MHz is shared with the NR (the DL carrier of LTE 700 MHz is not shared with NR due to heavy load of the DL carrier). At this time, the preamble may merely be transmitted on the NR dedicated carrier (3.5 GHz). The UL power for the preamble transmission is based on the estimated downlink path loss on the NR dedicated carrier.

In method 2, PL_offset between a high frequency band and a low frequency band is estimated according to frequency difference between the high frequency band and the low frequency band, the antenna configuration and other parameters. Preamble initial received target power of a low frequency band or DELTA_PREAMBLE is transmitted to a UE through system information. The preamble initial received target power of the low frequency band is equal to preamble initial received target power of a high frequency band minus the PL_offset. The DELTA_PREAMBLE of the low frequency band is equal to the preamble initial received target power of the high frequency band minus the PL_offset.

The preamble initial received target power is the initial power of the preamble that a base station expects to receive, and the DELTA_PREAMBLE is related to a preamble format.

For example, the path loss of the high frequency band is 110 dB, and the path loss of the low frequency band is 100 dB. The PL_offset is 10 dB. Therefore, the preamble initial received target power of the low frequency band is equal to the preamble initial received target power of the high frequency band minus 10 dB. DELTA_PREAMBLE is similar.

The UE may determine the uplink power for initially transmitting the preamble according to the downlink path loss obtained through calculation about the high frequency band, the preamble initial received target power of the low frequency band, and the DELTA_PREAMBLE, and power ramping up may be performed if the transmission fails subsequently.

In method 3, PL_offset between a high frequency band and a low frequency band is estimated according to frequency difference between the high frequency band and the low frequency band, the antenna configuration and other parameters. Low frequency band frequency information (shared carrier frequency information) or a combination serial number of the low frequency band and the high frequency band (a shared carrier frequency band and a dedicated carrier frequency band) are transmitted to the UE through system information. A UE determines the PL_offset between a high frequency band and a low frequency band according to the low frequency band frequency information (the shared carrier frequency information) or the combination serial number of the low frequency band and the high frequency band (the shared carrier frequency band and the dedicated carrier frequency band).

The UE obtains the downlink path loss of a low frequency band according to the downlink path loss obtained through calculation about the high frequency band and the PL_offset, so as to calculate uplink power for transmitting the preamble on the low frequency band.

For example, as shown in Table 1, a dedicated carrier frequency of NR is from 3.3 GHz to 4.2 GHz (DL and UL), and four cases exist for a usable frequency of a LTE shared UL carrier. The PL_offset is estimated in advance from parameters such as the frequency difference between a dedicated carrier and a shared carrier. A combination serial number of a shared carrier frequency band and a dedicated carrier frequency band is notified to a UE through system information block 2 (SIB 2), and the UE may know the PL_offset between a high frequency band and a low frequency band according to the serial number, so as to obtain accurate downlink path loss of the low frequency band.

TABLE 1

| Shared carrier and dedicated carrier frequency band combination serial number | Frequency range of NR | PL_offset |
| --- | --- | --- |
| 0 | 1710-1785 MHz (UL)/ 3.3-4.2 GHz*(DL and UL) | offset1 |
| 1 | 832-862 MHz (UL)/ 3.3-4.2 GHz*(DL and UL) | offset2 |
| 2 | 880-915 MHz (UL)/ 3.3-4.2 GHz*(DL and UL) | offset3 |
| 3 | 703-748 MHz (UL)/ 3.3-4.2 GHz* (DL and UL) | offset4 |

The second case is about for connected-state uplink transmission, how to determine path loss or UL transmit power for traffic transmission in a low frequency band (e.g., at the LTE shared carrier frequency F1).

In method 1, the method 1 is the same as the method 3 of the initial access.

In method 2, PL_offset of a low frequency band relative to a high frequency band is corrected by adjusting at least one of: nominal power P0, Fractional power control (FPC) path loss compensation coefficient $\alpha$ or closed loop f.

In order to support the adjustment of the difference between the high frequency path loss and the low frequency path loss, a possible value or a value range of at least one of the following: the nominal power P0, the compensation coefficient $\alpha$, or the closed loop f is extended. For example, a is not limited to 8 possible values. For example, 4 bits are used to support 16 possible values, and the PL_offset of the low frequency band relative to the high frequency band is better corrected.

In an embodiment, in order to support the adjustment of path loss difference between a first carrier and a second carrier, a value range of the nominal power P0 or a value range of the preamble initial target received power is extended.

For example, referring to simulation results, path loss difference between 3.5 GHz with beamforming and 2 GHz with beamforming is approximately 5 dB.

Path loss difference between 3.5 GHz with beamforming and 700 MHz is approximately 10 dB.

It is assumed that path loss of the high frequency band (3.5 GHz) is 110 dB.

The value set of FPC path loss compensation coefficient $\alpha$ is 10, 0.4, 0.5, 0.6, 0.7, 0.8, 0.9, 11.

If the compensation coefficient $\alpha$ of the high frequency band is configured to 1 and the compensation coefficient $\alpha$ of the low frequency band is configured to 0.9, the compensation can reach 11 dB. At the UE transmitting end, the path loss compensation of the uplink transmit power for the high frequency band is actually $\alpha*PL=1*110$ dB=110 dB. The path loss compensation of the uplink transmit power for the low frequency band is actually $\alpha*PL=0.9*110$ dB=99 dB. The PL is the calculated high-frequency downlink path loss. This value is close to the actual 700 MHz path loss, and the residual difference may be corrected through closed loop power control.

When the compensation coefficient α is possible to take more values, the compensation precision is more accurate. For example, a may be equal to 0.95, 0.85, 0.75, 0.65, etc.

The nominal power P0 is further divided into two parts, a cell nominal power and a UE specific nominal power. An evolved node B (eNodeB) semi-statically sets a physical uplink shared channel nominal power (P0_PUSCH) and a physical uplink control channel nominal power (P0_PUCCH) for all UEs in a cell, and the values are broadcasted through SIB2 system messages; where a value range of P0_PUSCH is −126 decibel milliwatt (dBm) to +24 dBm (all in terms of each resource block (RB)). A value range of P0_PUCCH is −126 dBm to −96 dBm.

In addition, each UE may also have a UE specific nominal power offset, which is transmitted to the UE through dedicated RRC signaling. P0_UE_PUSCH is an offset of different UEs for system nominal power P0_PUSCH and P0_UE_PUCCH is an offset of different UEs for system nominal power P0_PUCCH. The unit is dB, and the value is between −8 and +7.

It can be seen from the above parameters that the range of P0 is actually large enough to cover the path loss difference between 3.5 GHz and 700/800/900/1.7 GHz. the adjustment can be achieved through at least one of P0 or a in the initial phase and through closed loop f later. In order to support the adjustment of the difference of high and low frequency path loss, a possible value or a value range of the nominal power P0 is extended. For example, the nominal power offset for the UE specific is extended and the value is between −16 and +15.

Alternatively, the nominal power P0 further includes PL_offset adjustment power related to the high frequency and low frequency in addition to the cell nominal power and the UE specific nominal power. That is, the nominal power P0 is the sum of these three parts.

At least one of the P0 or the coefficient α of a UE in the low frequency band is determined according to the low frequency band frequency information (shared carrier frequency information) or the combination information of the low frequency band and the high frequency band (the shared carrier frequency band and the dedicated carrier frequency band), and the two parameters, P0 and the coefficient α, are notified to the UE through system information or RRC signaling. PL_offset between the low frequency band and the high frequency band is considered for a coefficient in the low frequency band relative to the coefficient α in the high frequency band, and the coefficient includes at least one of: p0 or coefficient α.

For example, the difference of the path loss of high and low frequencies is 10 dB, P0 in the high frequency band configured for a UE by a base station is −100 dBm, and P0 in the low frequency band configured for the UE by the base station is −110 dBm. For another example, a in the high frequency band configured for the UE by the base station is 1, and a in the low frequency band configured for the UE by the base station is 0.9.

Alternatively, the base station corrects the PL_offset of the low frequency band relative to the high frequency band through closed loop f. For example, f (an absolute value or a cumulative value) in the high frequency band configured for the UE by the base station is 10 dB, and f (an absolute value or a cumulative value) in the low frequency band configured for the UE by the base station is 0 dB.

In method 3, for the case that an uplink low carrier is used for NR UL transmission and that a DL carrier having the same frequency as the uplink low carrier or a downlink carrier paired with the uplink low carrier is not used for NR downlink traffic transmission, the DL carrier having the same frequency as the uplink low carrier or the downlink carrier paired with the uplink low carrier is limited to be used for downlink path loss estimation of NR in a low frequency band.

For example, an LTE UL F1 carrier may be used for NR UL transmission, and a DL F2 carrier (in the same frequency band as F1) paired with the LTE UL F1 carrier is not shared with NR. However, in order to support the path loss calculation and timing of F1, F2 is limited to be used for transmission of a specific NR downlink signal, but not for transmission of NR data (e.g., physical uplink shared channel (PUSCH)). The specific NR downlink signal transmitted on F2 should not affect transmission of the LTE signal/channel on F2, and the specific NR downlink signal is transmitted in a sparse manner of frequency-division multiplexing (FDM) or time-division multiplexing (TDM) with the LTE signal/channel.

Instance 2

The following is the scenario where transmission will not be performed at the same time.

In scenario 1, NR shares an LTE UL carrier. An NR UE transmits NR UL on an NR dedicated carrier and an LTE shared carrier. At a given moment, the NR UE merely transmits the NR UL on either of the above carriers and does not transmit the NR UL on the above carries at the same time.

In scenario 2, NR shares an LTE UL carrier. The NR UE supports NR and LTE capabilities, and is capable of transmitting NR UL on an NR dedicated carrier and transmitting NR UL or LTE UL on an LTE shared carrier. At a given moment, the NR UE merely transmits one type of traffic on either of the above carriers and does not transmit the one type of traffic on the above carries at the same time.

In scenario 3, LTE and NR are in a DC scenario. LTE is a master base station (MeNB) of a fourth generation mobile communication technology/a master base station (MgNB) of a fifth generation mobile communication technology/a master base station of a fourth generation mobile communication technology or a master cell group (MCG) of a fifth generation mobile communication technology, and NR is a secondary base station (SeNB) of a fourth generation mobile communication technology/a secondary base station (SgNB) of a fifth generation mobile communication technology/a secondary base station of a fourth generation mobile communication technology or a secondary cell group (SCG) of a fifth generation mobile communication technology. Alternatively, a master base station and a secondary base station are configured in an opposite way. At a given moment, a UE merely transmits one type of traffic, for example, merely transmits an LTE UL signal to an MCG, or merely transmits an NR UL signal to an SCG.

The following is the scenario where transmission will be performed at the same time.

In scenario 4, NR shares an LTE UL carrier. An NR UE transmits NR UL on an NR dedicated carrier and an LTE shared carrier. At a given moment, the NR UE may transmit the NR UL on the above carriers at the same time.

In scenario 5, NR shares an LTE UL carrier. The NR UE supports NR and LTE capabilities, and is capable of transmitting NR UL on an NR dedicated carrier and transmitting NR UL or LTE UL on an LTE shared carrier. At a given moment, the NR UE may transmit multiple types of RAT traffic on the above carriers at the same time.

In sub-scenario 5.1, transmission of NR UL on an NR dedicated carrier and transmission of LTE UL on an LTE shared carrier are performed at the same time.

In sub-scenario 5.2, transmission of NR UL on an NR dedicated carrier and transmission of LTE UL and NR UL on an LTE shared carrier are performed at the same time.

In sub-scenario 5.3, transmission of LTE UL and NR UL on an LTE shared carrier is performed at the same time.

In scenario 6, LTE and NR are in a DC scenario. LTE is MeNB/MgNB/MCG, and NR is SeNB/SgNB/SCG. Alternatively, a master base station and a secondary base station are configured in an opposite way. At a given moment, a UE may transmit LTE UL to an MCG (LTE eNB) and an NR UL to the SCG (NR gNB) at the same time.

For the uplink power control problems in the above scenarios or NR independent deployment or non-independent deployment scenarios, the solutions are as follows.

In method 1, a first type of subframe/slot and a second type of subframe/slot are semi-statically configured, where the first type of subframe/slot is used for simultaneously transmitting traffic of different carriers in the same subframe/slot or simultaneously transmitting traffic of different RATs in the same subframe/slot, and the second type of subframe/slot is used for transmitting traffic of a single carrier in the same subframe/slot or transmitting traffic of a single RAT in the same subframe/slot.

For example, for the scenario in which NR shares the LTE UL carrier, in the first type of subframe/slot, a UE may transmit the NR UL simultaneously on the NR dedicated carrier and the shared carrier.

For another example, NR and LTE are in a DC scenario, and in the first type of subframe/slot, the UE merely transmits LTE UL and NR UL simultaneously on an MCG and an SCG.

For example, for the scenario in which NR shares the LTE UL carrier, in the second type of subframe/slot, the UE merely transmits the NR UL on either of the NR dedicated carrier and the shared carrier and does not transmit the NR UL on the NR dedicated carrier and the shared carrier simultaneously.

For another example, the NR and the LTE are in a DC scenario, and in the second type of subframe/slot, the UE merely transmits the LTE UL or the NR UL on either of the MCG and the SCG and simultaneous transmission is not performed.

The semi-statically configuring may include: a high layer configures two types of subframes/slots through RRC signaling or system information and notifies the UE which subframes/slots belong to the first type of subframe/slot and which subframes/slots belong to the second type of subframe/slot.

For the first type of subframe/slot, due to a requirement of specific absorption rate (SAP) of power, transmit power of simultaneously transmitting traffic of different carriers or traffic of different RATs in a same subframe/slot cannot exceed a maximum transmit power (Pcmax) of the UE. Therefore, power between different carriers or different RATs of the same UE needs to be well allocated.

For the second type of subframe/slot, merely traffic of one carrier or traffic of one RAT can be transmitted in the same subframe/slot. Therefore, on any carrier, a normal UL power control algorithm is executed. Each carrier corresponds to a carrier maximum transmit power (Pcmax, c). The (Pcmax,c) of this carrier may be equal to the Pcmax of the UE, for example 23 dBm. No constraint exists between the maximum transmit powers of two frequency layers. That is, independent power control can be performed for the two carriers.

Therefore, different power control parameters may be configured for two types of subframes/slots. For example, since merely one type of traffic exists in the second type of subframe/slot at a same moment, the normal uplink power control algorithm is used. Since two types of traffic exist in the first type of subframe/slot at a same moment, power for the two types of traffic needs to be allocated, for example, a respective minimum power or highest power or priority is limited. However, no such constraint exists for the second type of subframe/slot.

In an embodiment, a base station notifies a UE of two sets of power control parameters corresponding to the two types of subframes/slots. The notification may be performed through RRC signaling, system information, or downlink control information (DCI) signaling.

In an embodiment, a UE may determine the type of any subframe/slot from implicit or explicit notification through uplink scheduling, or from notification of the type of subframe/slot through DCI signaling, such as group common DCI/physical downlink control channel (PDCCH).

In method 2, a third type of subframe/slot and a fourth type of subframe/slot are semi-statically configured, merely traffic of a first carrier (such as an NR dedicated carrier) or traffic of a first RAT (such as NR) is transmitted in the third type of subframe/slot, and merely traffic of a second carrier (such as a shared carrier) or traffic of a second RAT (such as LTE) is transmitted in the fourth type of subframe/slot.

The semi-statically configuring may include: a high layer configures two types of subframes/slots through RRC signaling or system information, and notifies the UE which subframes/slots belong to the third type of subframe/slot and which subframes/slots belong to the fourth type of subframe/slot.

In method 3, a base station semi-statically configures a fifth type of subframe/slot which is fixed used for transmitting traffic of a carrier or a RAT type.

The semi-statically configuring may include: a high layer configures which subframes/slots belong to the fifth type of subframe/slot through RRC signaling or system information, and notifies the UE of the configuration.

Instance 3

In the scenario, NR shares an LTE UL carrier. An NR UE transmits NR UL on an NR dedicated carrier and an LTE shared carrier.

The solutions are as follows.

A UE transmit power may be shared between two UL carrier frequencies. Each carrier of each UE may be configured with (Pcmax,c) of a carrier-frequency-specific, where c denotes a shared carrier or an NR dedicated carrier.

Consideration 1: A shared UL carrier frequency F1 is better in channel propagation characteristic than an NR dedicated carrier frequency F3. Therefore, if a total transmit power reaches a maximum transmit power of the UE, more power may be allocated to the NR dedicated carrier frequency F3.

Consideration 2: Considering that shared F1 will be used to transmit necessary signals such as PUCCH, and be used for edge UEs to transmit signals, more transmit power may be allocated to the shared F1.

Solution 1: The sum of two (Pcmax,c) needs to be equal to Pcmax, such as 23 dBm.

Semi-statically allocating the two maximum powers includes: half-dividing, and dividing according to priorities, where a maximum transmit power having a highest priority is larger, such as 40% and 60%. For example, if an MCG has a high priority, the (Pcmax,c) of the MCG is 60%.

Solution 2: The sum of two (Pcmax,c) may be greater than Pcmax, such as 23 dBm. (At this time, two (Pcmax, c) may also not be configured) Different or the same scaling factor is configured. Power scaling is performed when a total power exceeds a maximum power of a UE.

Each carrier is configured with a different scaling factor according to a priority, for example, a maximum transmit power of 200 mW (23 dBm) is reached, the scaling factor of the shared carrier is 0.4, and the scaling factor of the NR dedicated carrier is 0.6.

Solution 3: The power allocation firstly satisfied transmission on a carrier having a high priority or a better channel condition. If residual power exists, transmission on other carriers is performed. Alternatively, the power allocation firstly satisfied transmission on a carrier having a high priority or a worse channel condition. If residual power exists, transmission on other carriers is performed.

For example, the shared carrier has a higher priority, 23 dBm first satisfies the shared carrier, and if any residual power exists, the residual power is used for the dedicated carrier.

Alternatively, the channel condition of the shared carrier is better, and at this time, the UE is in a region with poor high frequency coverage of the dedicated carrier. If the power is used for the dedicated carrier, the power is required to be large and the performance is still poor, so the power is better used for the shared carrier.

Alternatively, the channel condition of the shared carrier is better, and channel condition of the dedicated carrier is relatively poor. For example, in the coverage range of 3.5 GHz, when more power is allocated to the dedicated carrier, UL performance on both carriers can be guaranteed.

Instance 4

LTE and NR are in a DC scenario. LTE is MeNB/MgNB/MCG, and NR is SeNB/SgNB/SCG. Or a master base station and a secondary base station are configured in an opposite way.

In method 1, it is only configured that a maximum uplink power of a UE cannot exceed a maximum transmit power (Pcmax) of the UE. That is, the total transmit power of UE UL LTE and NR cannot exceed the Pcmax. The UE reports two power headrooms (PHRs) to two gNBs or cell groups (CGs).

In method 2, it is configured that the UE LTE UL cannot exceed the LTE maximum transmit power (Pcmax_lte) and that the UE NR UL cannot exceed the NR maximum transmit power (Pcmax_nr). The sum of the Pcmax_lte and the Pcmax_nr needs to be smaller than the maximum transmit power Pcmax of the UE. The UE reports two PHRs to two gNBs or CGs.

In method 3, the minimum guaranteed power corresponding to each CG of the LTE MCG and the NR SCG is configured. The residual power is allocated according to the priority of the transmission signal/channel or the timing between the CGs.

Example 5

For multiplexing of different numerology (for example, a subcarrier spacing of 15 kHz is used for one and a subcarrier spacing of 60 kHz is used for another) or multiplexing of different traffic types, it is considered to meet the requirement of not exceeding the maximum transmit power of the UE.

For example, for the multiplexing of an enhanced mobile broad band (eMBB) (e.g., using a subcarrier spacing of 15 kHz) and an ultra reliable and low latency communication (URLLC) (e.g., using a subcarrier spacing of 60 kHz), one is that when the URLLC is transmitted, the eMBB is not transmitted, and the URLLC accords with the normal UL power control. The other is that the URLLC and the eMBB adopt a frequency-division Multiplexing (FDM) mode. The sum of the power of the eMBB and the power of the URLLC is likely to exceed the maximum transmit power of the UE, and the requirement of SAP is not met.

In method 1, a base station configures the maximum transmit power respectively for the eMBB and the URLLC, and the sum of the maximum transmit power does not exceed the maximum transmit power of the UE.

In method 2, the base station configures the minimum guaranteed transmit power respectively for the eMBB and the URLLC, and the sum of the minimum guaranteed transmit power does not exceed the maximum transmit power of the UE. The residual power is preferentially used for the URLLC, or the residual power is preferentially used for a high-priority transmission signal type (such as a control channel) or preferentially used for traffic types whose transmission timing is earlier.

In method 3, the UE preferentially uses power for transmitting the URLLC. If residual power exists, the residual power is used for transmitting eMBB. If no residual power exists, eMBB is not transmitted.

In method 4, the UE reports the power situation or power headroom (PH) for the URLLC transmission to the base station.

Example 6

LTE and NR are in a DC scenario. LTE is MeNB/MgNB/MCG, and NR is SeNB/SgNB/SCG. Alternatively, a master base station and a secondary base station are configured in an opposite way.

The PH is dynamically reported for improvement of power utilization rate in the DC scenario.

When the UE has uplink resources (whether LTE scheduling, NR scheduling, or both) for transmitting new data, the UE calculates the power headroom (PH). The PH may be the PH of an LTE carrier or of an NR carrier, or the PH relative to the maximum transmit power of the UE.

It is determined whether to report the PH according to different PH preset thresholds. The PH may be reported to the MCG and/or the SCG through the PUCCH or the MAC CE.

In addition to the above six instances, in the embodiment, the LTE DC has two uplink power allocation modes. Power control mode 1 (PCM1) is generally used for synchronous DC, and the UE allocates a minimum guaranteed power to each CG. The residual power is shared by the MCG and the SCG according to the type of transmission information. Power control mode 2 (PCM2) is generally used for asynchronous DC, and the UE also allocates a minimum guaranteed power to each CG, and the residual power is used by the CG whose transmission timing is early.

If NR is merely used for serving eMBB UEs that use the same numerology (e.g., subcarrier spacing, cyclic prefix, etc), LTE PCM1 or PCM2 may be reused. However, NR has more scenarios and problems, so it is necessary to optimize NR carrier aggregation (CA)/dual connectivity (DC) power control mechanism.

The instances in the present application are not limited to the described scenarios, and may be applied to similar scenarios or similar systems. The following instances may be implemented individually or in combination.

Instance 7: Multiplexing of Different Traffic

For the UE, if UL eMBB data is being transmitted and UL URLLC data arrives at this time, the URLLC data needs to be transmitted immediately to meet the latency requirements of URLLC.

If eMBB and URLLC use FDM, the URLLC should have a higher priority and should be allocated enough power. That is, the power requirements of the URLLC should be met. It is assumed that the power of the eMBB is P_embb and that the power of the URLLC is P_urllc.

If P_urllc> Pcmax-P_embb, that is, the power required by the URLLC is greater than the residual power of the UE. Then, on the Orthogonal Frequency Division Multiplexing (OFDM) symbol on which eMBB and URLLC are simultaneously transmitted, the P_embb should be reduced. The reduced power is used for the transmission of the URLLC. This operation is performed, and the transmit power in one subframe or slot is not kept constant any more. In order to achieve the above power allocation, two cases need to be considered.

Case 1: UL URLLC Based on Scheduling Grant

For scheduling-based UL URLLC, a gNB may transmit an explicit priority indication to the UE to reallocate the power of the eMBB before the URLLC is transmitted. The power of the eMBB may need to be reallocated for URLLC symbols to be transmitted. That is, two-step power control may be used.

The explicit priority indication may be transmitted through DCI.

Case 2: UL URLLC Based on Scheduling Grant-Exempt

An implicit method may be considered based on the grant-exempt UL URLLC. The gNB detects the UL URLLC signal transmitted by the UE. The gNB will assume that the UE reallocates the power of the eMBB based on a predefined principle. The predefined principle is the above principle of preferentially guaranteeing power for URLLC.

Instance 8: Different Duplex Modes

Different carriers on the NR's CA/DC may operate in different duplex modes.

According to reserving the minimum guaranteed power for the uplink transmission described above, if a slot or subframe of a CG is changed from UL to DL/idle/reserved, the guaranteed power allocated to the CG may be given or reallocated to a CG which has UL traffic transmission in this slot.

That is, the guaranteed power (generally the minimum guaranteed power) of each CG may be fixed, or may be lent to the other party when not in use. At this time, the own minimum guaranteed power is actually 0, and the minimum guaranteed power of the other party is the sum of the previous minimum guaranteed power of the other party and the borrowed minimum guaranteed power.

With this method, power usage efficiency is improved, which is beneficial for improving system throughput and enhancing coverage, especially in UL power limited scenarios. For duplex mechanisms like flexible duplex or dynamic TDD, the transmission direction of the slot or subframe changes dynamically. In order to perform the above method of reallocating the guaranteed power, the gNB may notify the UE of link direction information of the slot/subframe or information of a link direction change. The notification may be performed through DCI.

Instance 9: Enhanced Coverage

DC is mainly used for mobility and coverage enhancement. If a guaranteed power (or minimum guaranteed power) is configured for each CG, the power of each CG or each gNB is equal to or less than the maximum transmit power (Pcmax), and power limitation may cause uplink coverage problems. In order to solve the power limitation problem, it is necessary to consider how to use the reserved guaranteed power.

For the DC between NR and NR, the scheduling and hybrid automatic repeat request (HARQ) mechanism between different CGs are independent of each other because the connection between an MgNB and an SgNB is a non-ideal backhaul connection, and the MgNB and the SgNB cannot dynamically interact about scheduling information. However, from a perspective of the UE, the UE has all the information from the MgNB and the SgNB, and the two parts of information may be shared in the internal implementation of the UE. Thus, from the perspective of the UE, the DC may use more dynamic power allocation or power sharing.

For example: in method 1, more dynamic Power headroom (PHR) status or other information is reported through uplink control information (UCI).

In method 2, some slots/subframes are semi-statically reserved for one gNB or CG, these slots/subframes may be used for UL transmission of the gNB or CG, and other gNBs or CGs need to stop UL transmission in these slots/subframes.

For DC between LTE and NB, two types of slots/subframes are defined, a first type of slot/subframe is used for LTE, and a second type of slot/subframe is used for NR. Alternatively, the priority is defined for these two types of slots/subframes, and the first type of slot/subframe cannot be used for the NR, and can be used for the NR only when not in use for the LTE. The second type of slot/subframe cannot be used for the LTE, and can be used for the LTE only when not in use for the NR.

The above method may be used in conjunction with other power control solutions such as LTE DC PCM1/PCM2 (power scaling or minimum guaranteed power).

The UCI information in method 1 and method 2 includes at least one of the following: (1) the i-th component carrier CCi in the CG being switched from UL to DL or idle in the slot/subframe/symbol; (2) at least one of the serial number or the starting position of the slot/subframe/symbol, or the end position, or the duration; (3) a power offset value.

Instance 10: Wider Bandwidth

A wider bandwidth includes or is divided into multiple parts of the bandwidth, and the relationship between the parts of the bandwidth is similar to intra-band CA. Most power control solutions of NR CA may be used for aggregation of the parts of the bandwidth. The main difference between the parts of bandwidth and carrier aggregation within a frequency band and the corresponding solution include the following steps.

(1) Merely synchronous scenarios may be assumed between the parts of the bandwidth, i.e., multiple parts of the bandwidth within one wider bandwidth belong to a same timing alignment group (TAG). (2) Multiple parts of the bandwidth within one wider bandwidth use one common path loss value or reference signal received power (RSRP). The path loss value or RSRP is used for the parts of the bandwidth to perform UL power control. The common path loss value or RSRP may be obtained based on measurement of a part of the bandwidth that is limited or referenced. A channel state information-reference signal (CSI-RS)/synchronization signal (SS) is transmitted on the part of the bandwidth for radio resource management (RRM) measurement, such as RSRP measurement.

Alternatively, the CSI-RS or SS is separately transmitted over all or multiple parts of the bandwidth within the wider bandwidth for RRM measurement. That is, RRM measurement is performed independently on all or multiple parts of the bandwidth, and uplink power control is performed by using their own measured RSRP or path loss values.

(3) In order to reduce the interference caused by different numerology (for example, subcarrier spacing) used by multiple parts of the bandwidth and reduce the guard bandwidth interval, lower power is allocated to resource blocks (RBs) at edges of the parts of the bandwidth.

Instance 11: Combination of a Low Frequency (LF) Frequency Band and a High Frequency (HF) Frequency Band In order to solve the problem that two combination carriers (respectively belong to a low frequency and a high frequency) cannot be simultaneously transmitted, the two carriers use a TDM manner when CA/DC operations are performed. For similar methods, other examples such as the Enhanced coverage may be referenced.

Instance 12: Supplementary Uplink Frequency (SUL)

The main problem is that the characteristic difference between the SUL frequency and the dedicated carrier frequency is large. One method is to configure a downlink slot/subframe that is located in the SUL carrier or a downlink carrier paired with the SUL. The CSI-RS/SS is transmitted on such downlink slots/subframes for the UE to perform RSRP or path loss measurement. The measurement signal may be transmitted periodically or aperiodically. In order to reduce overhead, the period may be configured as a long period, or transmission and measurement is triggered once for a long time.

Instance 13: Two-Step (2-Step) Power Control

Since a time interval exists between scheduling grant and UL transmission, a UE has time to calculate and allocate transmit power for both LTE and NR links. 2-step power control may be used for dynamically reallocating power, and the specific method includes the following steps.

In step 1, power allocation is performed according to the existing UL power control algorithm. For example, an initial power control command and the scheduling grant are transmitted together to the UE.

In step 2, power is reallocated if needed.

For example, when URLLC transmission exists, power is reallocated before the transmission, and the UE is indicated by using DCI. The eMBB transmit power may be dynamically reduced even to 0 for the URLLC transmission of the UE or reduction of the interference in the neighboring URLLC traffic.

The DCI in step 2 includes at least one of the following information: (1) the i-th component carrier CCi in the CG being switched from UL to DL or idle in the slot/subframe/symbol; (2) at least one of a serial number or a starting position of slot/subframe/symbol, or an end position, or duration; (3) a power offset value.

In addition to explicit indication via DCI, an implicit method may also be considered. The gNB detects the UL URLLC signal transmitted by the UE. The gNB will assume that the UE reallocates the power of the eMBB based on a predefined principle. The predefined principle may be preferentially guaranteeing power or a power scaling level for URLLC.

Instance 14: NR and LTE DC

NR and LTE DC is a special scenario for DC between NRs, that is, coordination between different Radio Access Technologies (RATs) is involved. Considering that LTE and NR are independent of each other, power sharing between LTE and NR DC may be semi-statically configured. For example, the maximum transmit power is separately configured for each CG (including at least one of the following: LTE CG or NR CG). According to the priority of the traffic type and channel type, power sharing may be performed between component carriers within each CG. The maximum power of different CGs may be fixed or dynamically changed. The maximum power of the low-priority CG is the headroom after the sum of the maximum power of the other CGs.

Instance 15: Power Compensation of Two Types of Modulation and Coding Schemes (MCSs)

In the uplink power control algorithm, power compensation for the MCS format is considered, which is embodied in the Delta_MCS (referring to protocol TS36.213 version Release 14.0.0). During transmission in a transmission time interval (TTI), some resources and power will be given to other traffic such as URLLC transmission. In order to improve the receiving performance, it is necessary to perform power compensation on other resources that are not occupied by the URLLC.

Therefore, two types of MCS power compensation are set.

The first type (Delta_MCS1) is as follows: no power reallocation is performed. For example, normal transmission is performed according to the initial power control.

The second type (Delta_MCS2) is as follows: power reallocation is performed. For example, when part of resource of eMBB is given to the URLLC for use, power reallocation is performed, and for the resource not used by the URLLC, the value of the Delta_MCS2 is increased.

Embodiment 4

An embodiment of the present application further provides a storage medium. In the embodiment, the storage medium may be configured to store program codes for performing the steps described below.

In S1, a transmit power of a user equipment (UE) on a first carrier and a transmit power of the UE on a second carrier are determined.

In S2, first uplink traffic transmitted by the UE on the first carrier is received according to the transmit power on the first carrier is received, and second uplink traffic transmitted by the UE on the second carrier according to the transmit power on the second carrier is received.

In the embodiment, the above storage medium may include, but is not limited to, a USB flash disk, a read-only memory (ROM), a random access memory (RAM), a mobile hard disk, a magnetic disk, an optical disk or another medium capable of storing program codes.

In the embodiment, the processor performs the step of determining, according to the stored program codes in the storage medium, the transmit power of the UE on the first carrier and the transmit power of the UE on the second carrier.

In the embodiment, the processor performs the step of receiving, according to the stored program codes in the storage medium, first uplink traffic transmitted by the UE on the first carrier according to the transmit power on the first carrier, and second uplink traffic transmitted by the UE on the second carrier according to the transmit power on the second carrier. For examples in the embodiment, reference may be made to the examples described in the above embodiments and optional embodiments, and the examples will not be repeated in the embodiment.

It should be understood by those skilled in the art that each of the above-mentioned modules or steps of the present application may be implemented by a general-purpose computing apparatus, the modules or steps may be concentrated on a single computing apparatus or distributed on a network composed of multiple computing apparatuses. In an embodiment, each of the modules or steps of the present application may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

The invention claimed is:

1. A wireless communication method, comprising:
 receiving, by a user equipment (UE), a radio resource control (RRC) signaling message from a base station, wherein the RRC signaling message configures a subframe type for transmitting uplink traffic on a first carrier for a master cell group only, wherein the first carrier is configured as a carrier of the master cell group in a dual connectivity scenario; and
 transmitting, by the UE at a first time in time domain, a first uplink traffic on the first carrier using a subframe corresponding to the configured subframe type without simultaneously transmitting a second uplink traffic on a second carrier for a secondary cell group, wherein a guaranteed power is allocated to the first carrier for the first uplink traffic.

2. The method of claim 1, further comprising:
 transmitting, by the UE at a second time in time domain that is different than the first time, the second uplink traffic on the second carrier for the secondary cell group using a slot.

3. A wireless communication device that supports dual connectivity (DC), comprising:
 a processor; and
 a memory including processor-executable instructions stored thereon, the processor-executable instructions upon execution by the processor configures the processor to:
  receive a radio resource control (RRC) signaling message from a base station, wherein the RRC signaling message configures a subframe type for transmitting uplink traffic on a first carrier for a master cell group only, wherein the first carrier is configured as a carrier of the master cell group in a dual connectivity scenario; and
  transmit, at a first time in time domain, a first uplink traffic on the first carrier using a subframe corresponding to the configured subframe type without simultaneously transmitting a second uplink traffic on a second carrier for a secondary cell group, wherein a guaranteed power is allocated to the first carrier for the first uplink traffic.

4. The device of claim 3, wherein the processor is further configured to:
 transmit, at a second time in time domain that is different than the first time, the second uplink traffic on the second carrier for a secondary cell group using a slot.

5. A non-transitory computer readable storage medium storing computer readable code, the code, when executed by a processor, causing the processor to implement a method that comprises:
 receiving, by a user equipment (UE), a radio resource control (RRC) signaling message from a base station, wherein the RRC signaling message configures a subframe type for transmitting uplink traffic on a first carrier for a master cell group only, wherein the first carrier is configured as a carrier of the master cell group in a dual connectivity scenario; and
 transmitting, by the UE at a first time in time domain, a first uplink traffic on the first carrier using a subframe corresponding to the configured subframe type without simultaneously transmitting a second uplink traffic on a second carrier for a secondary cell group, wherein a guaranteed power is allocated to the first carrier for the first uplink traffic.

6. The non-transitory computer readable storage medium of claim 5, wherein the method further comprises:
 transmitting, by the UE at a second time in time domain that is different than the first time, the second uplink traffic on the second carrier for a secondary cell group using a slot.

* * * * *